United States Patent [19]

Baumberger

[11] Patent Number: 4,908,500
[45] Date of Patent: Mar. 13, 1990

[54] SYSTEM FOR AUTOMATICALLY READING INDENTIFICATION DATA DISPOSED ON A VEHICLE

[75] Inventor: Philippe Baumberger, Bourg la Reine, France

[73] Assignee: Campagnie Generale D'Automatisme CGa-HBS, Paris, France

[21] Appl. No.: 211,193

[22] Filed: Jun. 24, 1988

[30] Foreign Application Priority Data

Jun. 29, 1987 [FR] France ............... 87 09139

[51] Int. Cl.⁴ ............................................. G07B 15/02
[52] U.S. Cl. ..................................... 235/384; 235/472
[58] Field of Search ..................... 235/384, 472; 382/9

[56] References Cited

U.S. PATENT DOCUMENTS 4,555,618 11/1985 Riskin .
4,567,609 1/1986 Metcalf .................................... 382/9

FOREIGN PATENT DOCUMENTS 0040839 12/1981 European Pat. Off. .
0002537 9/1984 European Pat. Off. .
2809692 9/1979 Fed. Rep. of Germany .
2805833 9/1984 Fed. Rep. of Germany .
2834337 9/1984 Fed. Rep. of Germany .
2397024 2/1979 France .
2455317 11/1980 France .
2297460 9/1984 France .
2570528 3/1986 France .
2138982 10/1984 United Kingdom .

Primary Examiner—Harold I. Pitts
Attorney, Agent, or Firm—Sughrue, Mion, Zinn, Macpeak & Seas

[57] ABSTRACT

A system for automatically reading identification data on a vehicle, characterized in that it comprises a television camera connected to a processor unit, with a memory unit containing an identification data list relating to n vehicles, said list being pre-acquired or being acquired at the beginning of each transaction, and means for reading the contents of the memory and for comparing said contents with the output signal from the processor unit to supply a recognition or non-recognition signal which is applied to automatic control means for controlling a device that authorizes or does not authorize access. For each vehicle, said identification data is constituted by the vehicle number plate which is associated with an additional optical marker adjacent to the number plate, said marker being selected in such a manner as to produce a highly characteristic video signal which is easily analyzed by said processor unit.

5 Claims, 1 Drawing Sheet

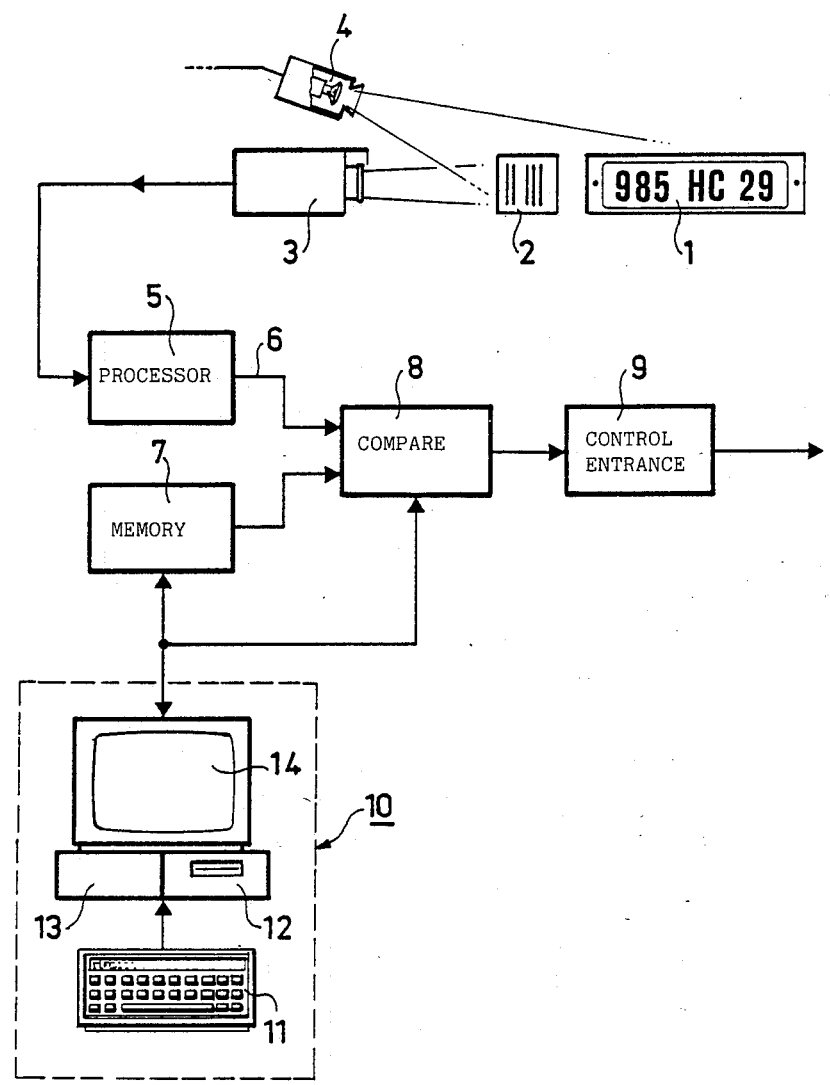

SYSTEM FOR AUTOMATICALLY READING INDENTIFICATION DATA DISPOSED ON A VEHICLE

The present invention relates to a system for automatically reading identification data disposed on a vehicle.

The invention relates, in particular, to authorizing subscriber access to pay car parks or to toll motorways.

BACKGROUND OF THE INVENTION

It is advantageous to be able to automatically read identification data on a vehicle in order to automatically recognize from a list whether or not the vehicle counts as a subscriber for which access is authorized with payment being performed automatically by debiting an account held by the operating company or by paying a flat fee in advance when taking out the subscription.

The invention also applies to capturing vehicle identification data and storing the time of arrival in a car park or at an entrance to a motorway together with the identification data in order to calculate an amount to be paid on exit at a point-of-sale terminal having access to said stored data.

The characteristic data for identifying a vehicle is naturally constituted by its number plate.

For the operator of a pay car park or toll motorway, the advantage of using number plates as vehicle identification data lies in the fact that there is no need to invent a special characteristic code since such a code already exists, is very reliable, and is, in addition, highly dissuasive of attempts at fraud by small-time cheats.

However, in order to avoid slowing down arrivals, the numbers must be read automatically very quickly, and in practice they must be read on vehicles which are moving.

In this respect, it is a computationally long and difficult task to read a number plate and in particular to identify it and distinguish it from the other written matter which is often present on the rear of a vehicle, e.g. stickers with various messages.

SUMMARY OF THE INVENTION

The object of the present invention is to mitigate this drawback, and the present invention provides a system for automatically reading identification data applied to a vehicle, the system comprising a television camera connected to a processor unit, said identification data being constituted, on each vehicle, by the vehicle number plate and being associated with an additional optical marker adjacent to the number plate, said marker being selected in such a manner as to produce a highly characteristic video signal which is easily analyzed by said processor unit.

Advantageously, said additional optical marker is constituted by a plate having a reflecting surface.

It is preferable to use a CCD television camera associated with a source of infrared illumination.

In order to optimize number plate reading, the additional optical marker advantageously carries a code, such as a bar code for example, suitable for preselecting the algorithms implemented by the processor unit.

In a particular application, said processor unit produces output signals representative of said identification data, and said system further includes a memory unit containing an identification data list relating to n vehicles, said list being pre-acquired or being acquired at the beginning of each transaction, and means for reading the contents of the memory and for comparing said contents with the output signal from the processor unit to supply a recognition or non-recognition signal which is applied to automatic control means for controlling a device for authorizing or not authorizing access.

BRIEF DESCRIPTION OF THE DRAWING

An embodiment of the invention is described by way of example with reference to the sole FIG. of the accompanying drawing in which the sole fig. is a block diagram of the system in accordance with the invention applied to the specific and non-limiting case of subscribers appearing in a list.

MORE DETAILED DESCRIPTION

A vehicle (not shown) carries a number plate 1. An additional optical marker 2 is added to the number plate.

The main purpose of the marker is to make it easier for an automatic image scanning system to automatically locate the number plate 1. To this end, the marker 2 may have a special shape serving to make it easily distinguishable in a video signal, and above all it is advantageously reflective.

In addition, it may include a code such as a bar code in order to optimize automatic reading of the plate 1 by preselecting the processing algorithms to be used, as a function, for example:

of the nationality of the vehicle;
of the graphical design of the number plate; or
of the color of the number plate.

The code may also provide information additional to that on the plate 1, for example it may specify whether a subscription exists or not, it may specify the type of subscription, the class of the vehicle, a validity duration, or a validity zone. It may also serve to validate the information read from the number plate by comparing it with a check code and performing error correction, if necessary.

A fixed station, for example an entrance to a pay car park, is fitted with a television camera 3, for example a CCD type camera, associated with an illuminating source 4 of infrared radiation.

The video signal provided by the camera 3 is analyzed by a processor unit 5 which provides an output signal 6 characteristic of data on the number plate 1. The system also includes a memory unit 7 which stores information relating to the number plates of a plurality n of subscribers. The memory 7 is read and compared with the signal 6 in a read and compare unit 8 which provides a signal indicative of the presence or absence of the number on the plate 1 in the list in the memory 7. An automatic control 9 causes a barrier to open and/or close or causes a traffic light to authorize or prohibit passage.

The assembly further includes an entrance and control terminal 10 connected to the memory 7 and to the unit 8, and including a keyboard 11, a floppy disk memory unit 12, a coupling unit 13, and a screen 14.

The marker 2 is suitable for producing a characteristic video signal which can easily be analyzed by the processor unit 5. For example it may saturate the video signal, with the code marked thereon being constituted by black bars. Since the marker 2 is easily located, it is possible to identify users in the memory 7 both quickly and completely. Said users may have privileged access to a motorway, to a car park, or to any other site having controlled access.

In an application with non-subscriber users, the processor unit 5 stores a time of arrival together with the vehicle identification data, thereby making it possible to calculate the amount due at an exit point-of-sale terminal having access to the data stored on arrival. The processor unit 5 is then directly connected to the automatic control 9 for authorizing the vehicle to pass freely.

I claim:

1. A system for automatically reading identification data from a vehicle number plate of a vehicle, the system comprising a television camera for providing an image signal representing an image of said vehicle number plate, a processor unit for receiving and processing said image signal so as to recognize said identification data, and an additional optical marker adjacent to the vehicle number plate, said marker being selected in such a manner as to produce a highly characteristic video signal which is easily analyzed by said processor unit.

2. A vehicle recognition system according to claim 1, wherein said addition optical marker is constituted by a plate having a reflecting surface.

3. A vehicle recognition system according to claim 2, wherein said camera is a CCD camera associated with a source of infrared illumination.

4. A vehicle recognition system according to claim 1, wherein said additional optical marker further carries a code enabling the algorithms implemented by the processor unit to be preselected.

5. A vehicle recognition system according to claim 1, wherein said processor unit produces output signals representative of said identification data, and wherein said system further includes a memory unit containing an identification data list relating to n vehicles, said list being pre-acquired or being acquired at the beginning of each transaction, and means for reading the contents of the memory and for comparing said contents with the output signal from the processor unit to supply a recognition or non-recognition signal which is applied to automatic control means for controlling a device for authorizing or not authorizing access.

* * * * *